C. H. KAYSER.
PIPE AND CONDUCTOR COUPLING.
APPLICATION FILED APR. 13, 1910.

982,006.

Patented Jan. 17, 1911.

WITNESSES:
Allan N. Goose.
May T. McGarry.

INVENTOR
Charles H. Kayser
BY
Paul Benjamin
his ATTORNEY.

UNITED STATES PATENT OFFICE.

CHARLES H. KAYSER, OF NEW YORK, N. Y., ASSIGNOR TO INTERNATIONAL ELECTRIC PROTECTION COMPANY, A CORPORATION OF NEW YORK.

PIPE AND CONDUCTOR COUPLING.

982,006.  Specification of Letters Patent.  Patented Jan. 17, 1911.

Application filed April 13, 1910. Serial No. 555,176.

*To all whom it may concern:*

Be it known that I, CHARLES H. KAYSER, a citizen of the United States, residing at New York, in the county of New York and State of New York, have invented a certain new and useful Improvement in Pipe and Conductor Couplings, of which the following is a specification.

The invention is a coupling for connecting adjacent pipe sections and also electrical conductors inclosed in said sections.

It is especially applicable to the long thin metal pipes of small diameter which are used in connection with high temperature alarms, and which operate by the production of impulses in the air confined in them, or by the pressure of said confined air, due to the increase of surrounding temperature—the said impulses or air currents then acting upon audible or visual alarm devices. Where such pipes also contain electrical conductors for controlling certain other alarms, the problem is not only to connect the abutting ends of the pipe sections, but also those of the wires inclosed in them; so that tight joints will be made, preventing the escape from the pipe of the air when under pressure, and good electrical connections will be established between the inclosed wires. This, my present device accomplishes.

Figure 1:
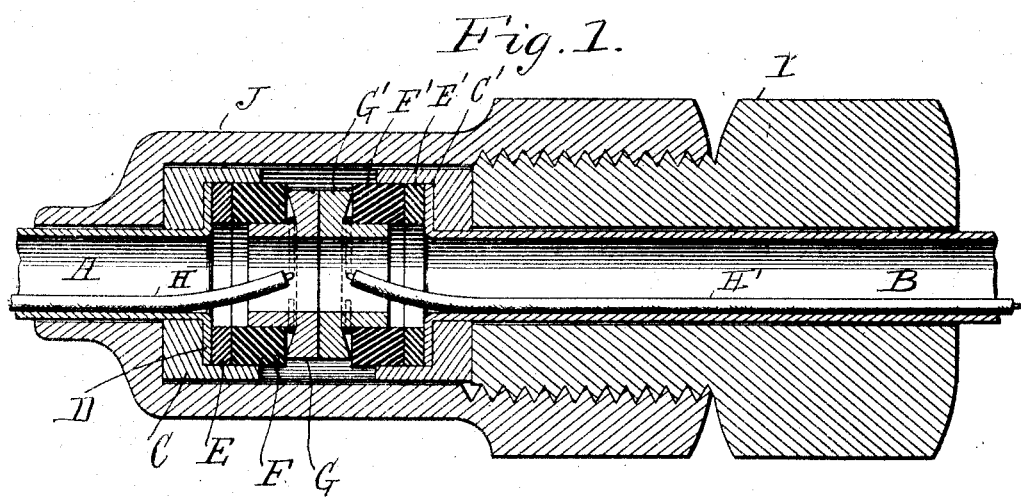
Figure 2:
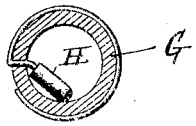

In the accompanying drawings—Figure 1 is a longitudinal section of my coupling, and Fig. 2 is a transverse section, showing the mode of connecting the end of the wire conductor to one of the hollow cylindrical terminals.

Similar letters and numbers of reference indicate like parts.

A and B respectively represent the end portions of adjacent pipe sections to be coupled together. Upon the section A is first placed a metal sleeve C which fits closely on said end, and over part of its length is of enlarged diameter, so that the extremity of the metal pipe can be flanged over, as shown at D, and so secured in said sleeve. Within the sleeve C is inserted first an annular leather washer E, and then rubber washer F. Within the washer F enters the end of a flanged hollow cylindrical terminal G of conducting material, preferably metal. The inner side of the flange is beveled or undercut. In the wall of terminal G is an opening, through which passes the uncovered end of the wire H contained in the pipe section A. Said end is secured to said terminal by winding the same around the outside of said terminal, as shown in Fig. 2. The wound portion of wire H then lies in the angle formed by the undercutting of the flange of terminal G. Precisely similar parts at G', F', E', C' are associated in like manner with the end of pipe section B, so that when the pipe ends are approximated, the outer face of terminal G on section A comes in contact with the outer face of terminal G' on section B.

Upon section B is an externally threaded coupling sleeve I, and upon pipe section A is a sleeve J enlarged internally to receive the parts previously described, and then internally threaded to engage with sleeve I. When the sleeves I and J are set up to draw the pipe sections A and B together, the leather washers E, E' are forced against the pipe flanges C, C'. and the sharp beveled outer circumferential edges of terminals G, G' are forced into the rubber washers F, F', thus forming close joints which prevent any escape of the air contained within the pipe. Electrical connection between the wire H in section A and the wire H' in section B is then also established through the contacting metal terminals G, G'.

I claim:

1. Two pipe sections having shouldered enlargements at their facing ends, elastic packing rings seated in said enlargements, hollow cylindrical terminals seated in said rings and having circumferential flanges, and conducting wires in said pipes extending through openings in the walls of said terminals and wound around said terminals between said flanges and said rings.

2. In combination with abutting pipe sections and a coupling device therefor, two hollow cylindrical terminals interposed and supported between said sections and having openings in their walls, flanges on said terminals having their outer faces beveled, elastic washers on said terminals, and wires in said sections passing through said terminal openings and wound on the exterior of said terminals between said flanges and said washers.

3. In combination with abutting pipe sections and conducting wires therein, flanges on the ends of said sections, sleeves supported on said sections and extending over said flanges, elastic washers disposed in said sleeves and bearing on said flanges, two hollow cylindrical terminals seated in said washers and having flanges received between the opposing faces of said washers and respectively connected electrically to said wires, a threaded sleeve on one of said pipe sections inclosing said flanges, sleeves, washers and terminals, and a correspondingly threaded sleeve on the other pipe section.

In testimony whereof I have affixed my signature in presence of two witnesses.

CHARLES H. KAYSER.

Witnesses:
GERTRUDE T. PORTER,
MAY T. MCGARRY.